US012604886B2

(12) United States Patent　　　　(10) Patent No.:　US 12,604,886 B2
Flint et al.　　　　　　　　　　　　　(45) Date of Patent:　　Apr. 21, 2026

(54) PEST BARRIER

(71) Applicants:John Noel Flint, West End (AU);
Lynne Patricia Oldfield, West End
(AU)

(72) Inventors: John Noel Flint, West End (AU);
Lynne Patricia Oldfield, West End
(AU)

(73) Assignees: John Flint (AU); Lynne Oldfield (AU)

( * ) Notice: Subject to any disclaimer, the term of this
patent is extended or adjusted under 35
U.S.C. 154(b) by 282 days.

(21) Appl. No.: 17/441,174

(22) PCT Filed: Mar. 20, 2020

(86) PCT No.: PCT/AU2020/050270

§ 371 (c)(1),
(2) Date: Sep. 20, 2021

(87) PCT Pub. No.: WO2020/191432

PCT Pub. Date: Oct. 1, 2020

(65) Prior Publication Data

US 2022/0159944 A1　　May 26, 2022

(30) Foreign Application Priority Data

Mar. 22, 2019　(AU) ................................ 2019900971

(51) Int. Cl.
　　*A01M 29/30*　　　(2011.01)
　　*A01M 29/12*　　　(2011.01)
(52) U.S. Cl.
　　CPC ............ *A01M 29/30* (2013.01); *A01M 29/12*
　　　　　　　　　　　　　　　　　　　　(2013.01)
(58) Field of Classification Search
　　CPC ........ A01M 29/12; A01M 29/30; A01M 1/20;
　　　　　　　　　　　A01M 1/2022; A01M 1/2024;
(Continued)

(56) References Cited

U.S. PATENT DOCUMENTS 2,899,771 A * 8/1959 Burris, Jr. ............. A01M 1/245
　　　　　　　　　　　　　　　　　　　　52/517
4,102,093 A * 7/1978 Harris ................... E04B 1/7053
　　　　　　　　　　　　　　　　　　　　52/517
(Continued)

FOREIGN PATENT DOCUMENTS

AU　　　　713335 B2　　7/1997
AU　　　　3506099 A　　1/2000
(Continued)

OTHER PUBLICATIONS

International Search Report as received in PCT Application No.
PCT/AU2020/050270 with a mailing date of May 4, 2020, 4 pages.
(Continued)

*Primary Examiner* — James J Buckle, Jr.

(57)　　　　　　ABSTRACT

A pest barrier (10, 10', 10", 10'", 10""), comprising a body
(12, 112) for installation in or over an opening in a building
to inhibit passage of pests through the building opening
(200, 302). Body (12, 112) is formed from one or more
components and comprises one or more first opening (**18,
28, 29, 116**) extending therethrough to facilitate ventilation
through the building opening when the body is installed
therein or thereover. A pest repellent is carried by at least
part of body (12, 112) and has efficacy within a first zone
extending a predetermined first distance inwardly from a
perimeter of the one or more first opening (18, 28, 29, 116)
to deter one or more target pest species from passing through
the one or more first opening and/or within a second zone
extending a predetermined second distance outwardly from
the body (12, 112) toward the periphery of the building
opening (200, 302) to deter said one or more target pest
species from passing through each of one or more second
opening in the second zone.

15 Claims, 13 Drawing Sheets

(58) Field of Classification Search
CPC .. A01M 1/2044; A01M 1/2055; A01M 29/00; A01M 29/34; A04M 13/00
USPC ................................ 52/101; 43/124.1, 132.1
See application file for complete search history.

(56) References Cited

U.S. PATENT DOCUMENTS

| | | | | |
|---|---|---|---|---|
| 5,203,795 | A | * | 4/1993 | Balamut ............... E04B 1/7076 |
| | | | | 52/302.1 |
| 5,417,017 | A | * | 5/1995 | Toutountzis ............ A01M 1/24 |
| | | | | 245/8 |
| 6,044,594 | A | * | 4/2000 | Desselle ............... E04B 1/7053 |
| | | | | 52/302.3 |
| 6,474,031 | B2 | * | 11/2002 | Phillips ................. E04B 1/7061 |
| | | | | 52/302.1 |
| 8,844,191 | B2 | * | 9/2014 | Sala ...................... A01M 29/34 |
| | | | | 43/132.1 |
| 9,903,108 | B2 | | 2/2018 | Flint et al. |
| 10,004,218 | B1 | * | 6/2018 | Goodspeed ............... E04B 1/72 |
| 11,459,747 | B2 | * | 10/2022 | Flint ......................... E04B 1/72 |

| | | | | |
|---|---|---|---|---|
| 2006/0260183 | A1 | * | 11/2006 | Hockaday ............... A01M 1/02 |
| | | | | 43/132.1 |
| 2008/0276556 | A1 | * | 11/2008 | Flint ..................... E04B 1/7069 |
| | | | | 52/302.1 |
| 2012/0047792 | A1 | * | 3/2012 | Sala .......................... E04B 1/72 |
| | | | | 514/521 |
| 2014/0250788 | A1 | * | 9/2014 | Schild, III ............ A01M 29/30 |
| | | | | 49/58 |
| 2016/0150775 | A1 | | 6/2016 | Berengardt et al. |

FOREIGN PATENT DOCUMENTS

| | | | |
|---|---|---|---|
| AU | 2007237177 | B2 | 12/2007 |
| EP | 2745688 | A1 | 6/2014 |
| JP | H07127149 | A | 5/1995 |
| WO | 2020191432 | A1 | 10/2020 |

OTHER PUBLICATIONS

Written Opinion as received in PCT Application No. PCT/AU2020/050270 with a mailing date of May 4, 2020, 4 pages.

* cited by examiner

10'                                        300

PEST BARRIER

CROSS-REFERENCE TO RELATED APPLICATIONS

The present application claims priority from Australian Provisional Patent Application No 2019900971 filed on 22 Mar. 2019, the contents of which are incorporated herein by reference in their entirety.

TECHNICAL FIELD

The present disclosure relates to a pest barrier for inhibiting entry of pests through an opening in a building. Examples of openings with which the pest barrier may be used include, but are not limited to: an opening between a concrete slab and an external building wall; a sub-floor vent or other vent; a weep hole in a masonry wall; and an opening between a door or window frame and a masonry wall.

BACKGROUND

Cavity walls, such as brick-veneer or double brick cavity walls, are commonly used for the external walls of buildings. The interior, structural component of a cavity wall is typically supported on a concrete slab, with the exterior component or "skin" of the wall being spaced apart from the interior component to define a cavity for ventilation and drainage. An opening into the cavity is typically provided at the base of the wall, between the slab and the exterior component, to allow for drainage of moisture from the cavity. This opening can allow insects, such as termites, and other unwanted pests, such as rodents and reptiles, to enter the cavity. To inhibit entry of pests, it is known to install a mechanical barrier, such as a mesh, in the opening. Unfortunately, such mechanical barriers are not particularly effective, as gaps often remain between the mesh and the walls of the cavity. Similar problems are experienced when attempting to inhibit pest entry through sub-floor vents and other construction openings.

In cavity brick or block masonry construction, weep hole openings are left in mortar joints just above the flashing to allow both ventilation and drainage of the wall cavity between the exterior masonry and the interior wall. A weep hole opening is typically formed by the omission of mortar between two adjacent bricks or blocks. The weep hole opening provides ventilation and drainage to help keep the wall cavity dry. Without adequate ventilation, dampness in the wall cavity causes mildew and rot, which reduce the life of the structure.

Weep hole openings vary considerably in size and shape dependent on the skill and care of the tradesmen and the type of brick and type of finishes being applied. It is common for weep hole openings to be situated close to ground level, around windows and, in multi-storey buildings, near the bottom of the walls of the second and higher storeys. Weep hole openings can become an entry for various pests, including insects, such as termites, as well as rodents and reptiles. A weep hole opening leading to the wall cavity is an ideal home for bees, wasps and other insects, which themselves create food sources for other pests.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each claim of this application.

SUMMARY

Throughout this specification:

the words "comprise", "include", "have", and variations such as "comprises", "includes", "has", "comprising", "including" and "having", will be understood to imply the inclusion of a stated element, integer or step, or group of elements, integers or steps, but not the exclusion of any other element, integer or step, or group of elements, integers or steps;

the word "mesh" will be understood to encompass a structure having an array of openings therein, such as a mesh formed from wires or strands, or a sheet with apertures therein;

the term "carried by" will be understood as encompassing something that is on, in or otherwise carried by something else, with a corresponding definition applying to the term "carrying"; and the term "pest repellent" will be understood as encompassing any chemical that acts to repel pests, regardless of whether the chemical may also act as a pesticide.

Disclosed herein is a pest barrier comprising:

a body for installation in or over an opening in a building to inhibit passage of pests through the building opening, the body being formed from one or more components and comprising one or more first opening extending therethrough to facilitate ventilation through the building opening when the body is installed therein or thereover; and a pest repellent carried by at least part of the body and having efficacy within a first zone extending a predetermined first distance inwardly from a perimeter of the one or more first opening to deter one or more target pest species from passing through the one or more first opening and/or within a second zone extending a predetermined second distance outwardly from the body toward the periphery of the building opening to deter said one or more target pest species from passing through each of one or more second opening in the second zone.

The one or more first opening and/or one or more second opening may have a maximum dimension of less than 30 mm or less than 20 mm or less 10 mm or less than 5 mm or less than 4 mm or less than 3 mm or of around 2 mm. The maximum dimension of the one or more first opening and/or the one or more second opening may be at least around 2 mm. The predetermined first distance may be at least half of the maximum dimension of the one or more first opening and/or the predetermined second distance may be at least half of the maximum dimension of the one or more second opening.

The predetermined first distance and/or predetermined second distance may be at least 1 mm or at least 1.5 mm or at least 2 mm or at least 2.5 mm or at least 5 mm or at least 10 mm or at least 15 mm.

The body may comprise a spine portion and a resilient fringe extending at least partially around the spine portion. The fringe may be oversized relative to the building opening and may be configured to resiliently deform to allow the pest barrier to be installed in the building opening and to engage walls of the building opening to secure the pest barrier therein. The fringe may be defined by slits in the body, the slits defining tabs therebetween.

The body may comprise a mesh. The mesh may be a woven or unwoven mesh of fibres or strands, or a sheet with apertures therein. The mesh may be elastically deformable from an initial relatively expanded configuration into a relatively collapsed configuration to facilitate its installation in an opening between a pair of mutually opposed substantially parallel surfaces and its resilient expansion into engagement between the pair of surfaces. The mesh may be U-shaped when in the relatively collapsed configuration. The mesh may be formed from a plastics material or from a metal, such as steel, bronze or aluminium. An adhesive may be provided along a surface portion of the mesh to facilitate securing the surface portion of the mesh to or adjacent a construction opening. A removable backing may be provided over the adhesive.

The pest repellent may be present in a coating applied to at least part of the body. Alternatively, or in addition, at least part of the body may be impregnated with the pest repellent. The at least part of the body impregnated with the pest repellent may comprise a polymer material, such as low density polyethylene (LDPE), polypropylene (PP), polyvinylchloride (PVC) or polyurethane (PU). The pest repellent may comprise a pyrethroid, such as bifenthrin, cypermethrin, permethrin, fenitrothion or fenvalerate, another pest repellent chemical having a residual effect, such as disodium octaborate tetrahydrate or chlorpyrifos, or a combination of such chemicals. The pest repellent may comprise an insecticide, and may specifically comprise a termiticide. The pest repellent may be a pesticide. The pest repellent may comprise bifenthrin. The coating and/or part of the body impregnated with the pest repellent may comprise at least around 0.1 wt % bifenthrin. In some embodiments, the coating and/or part of the body impregnated with the pest repellent may comprise at least around 0.2 wt % bifenthrin or at least around 0.3 wt % bifenthrin or at least around 0.4 wt % bifenthrin or at least around 0.5 wt % bifenthrin. In some embodiments, the coating and/or part of the body impregnated with the pest repellent may comprise between around 0.1 wt % and around 0.3 wt % bifenthrin. In other embodiments, the coating and/or part of the body impregnated with the pest repellent may comprise between around 0.3 wt % and around 0.5 wt % bifenthrin.

The body may comprise a tubular housing defining an elongate passageway extending through the body. The passageway may define the one or more first opening. Alternatively, a physical barrier may extend across the passageway, the one or more first opening being provided in the physical barrier. The physical barrier may comprise a mesh, such as a woven or unwoven mesh of fibres or strands, or such as a sheet or grate with apertures therein. In some embodiments, the physical barrier may carry the pest repellent having efficacy within the first zone. In some embodiments, the tubular housing may carry the pest repellent having efficacy within the second zone. In some embodiments, the physical barrier may carry the pest repellent having efficacy within the first zone and the second zone. The physical barrier may be removably connected to the tubular housing. The pest repellent having efficacy within the second zone may be the same as or different to the pest repellent having efficacy within the first zone.

The pest barrier may be an insert for installation in a weep hole opening in a masonry wall.

Also disclosed is a pest repelling apparatus for installation in or adjacent an elongate opening, the apparatus comprising:

a substrate, which may be in the form of a strip, sheet or film, at least a surface portion of the substrate carrying between around 0.1 wt % and around 0.5 wt % bifenthrin, such as between around 0.1 wt % and around 0.3 wt % bifenthrin or between around 0.3 wt % and around 0.5 wt % bifenthrin.

The substrate may be provided in a roll format such that a desired length of pest repelling apparatus may be cut from the roll.

Also disclosed is a method of inhibiting passage of pests through an opening in a building, the method comprising:

installing a pest repelling body in, over or adjacent the building opening such that ventilation through the building opening is at least partially maintained;

the pest repelling body carrying a pest repellent having efficacy within a first zone extending a predetermined distance from the pest repelling body into an area of the building opening through which ventilation is maintained to deter one or more target pest species from passing through the area of the building opening through which ventilation is maintained.

In embodiments where the pest repelling body is installed in or over the building opening, the pest repelling body may comprise one or more opening extending therethrough to facilitate ventilation through the building opening when the pest repelling body is installed therein or thereover. The body may comprise any one or more of the features defined in the paragraphs above.

In embodiments where the pest repelling body is installed in, adjacent or over the building opening, the pest repelling body may comprise a substrate, which may be in the form of a strip, sheet or film, the substrate comprising between around 0.2 wt % and around 0.5 wt % bifenthrin. The substrate may be provided in a roll format such that a desired length of pest repelling apparatus may be cut from the roll.

The area of the building opening through which ventilation is maintained may comprise at least one opening, the or each said at least one opening having a maximum dimension of less than 30 mm or less than 20 mm or less 10 mm or less than 5 mm or less than 4 mm or less than 3 mm or of around 2 mm. The maximum dimension of the or each said at least one opening may be at least around 2 mm.

Rights are reserved in any novel combination of steps, features, integers, compositions and/or compounds disclosed herein, including in the drawings.

BRIEF DESCRIPTION OF DRAWINGS

The principles disclosed herein will now be described, by way of example only, with reference to the accompanying drawings, in which:

FIGS. 5 to 8 show a pest barrier for installation in a masonry wall weep hole, the pest barrier embodying principles disclosed herein, wherein FIG. 5 shows the pest barrier and an associated handle, FIGS. 6 and 7 show the pest barrier in the process of being installed in a weep hole, and FIG. 8 shows the pest barrier installed in the weep hole;

FIGS. 13 to 16 show another pest barrier for installation in a masonry wall weep hole, the pest barrier embodying principles disclosed herein, wherein FIG. 16 shows the pest barrier with its pest repellent grate removed.

DESCRIPTION OF EMBODIMENTS

Figure 1:
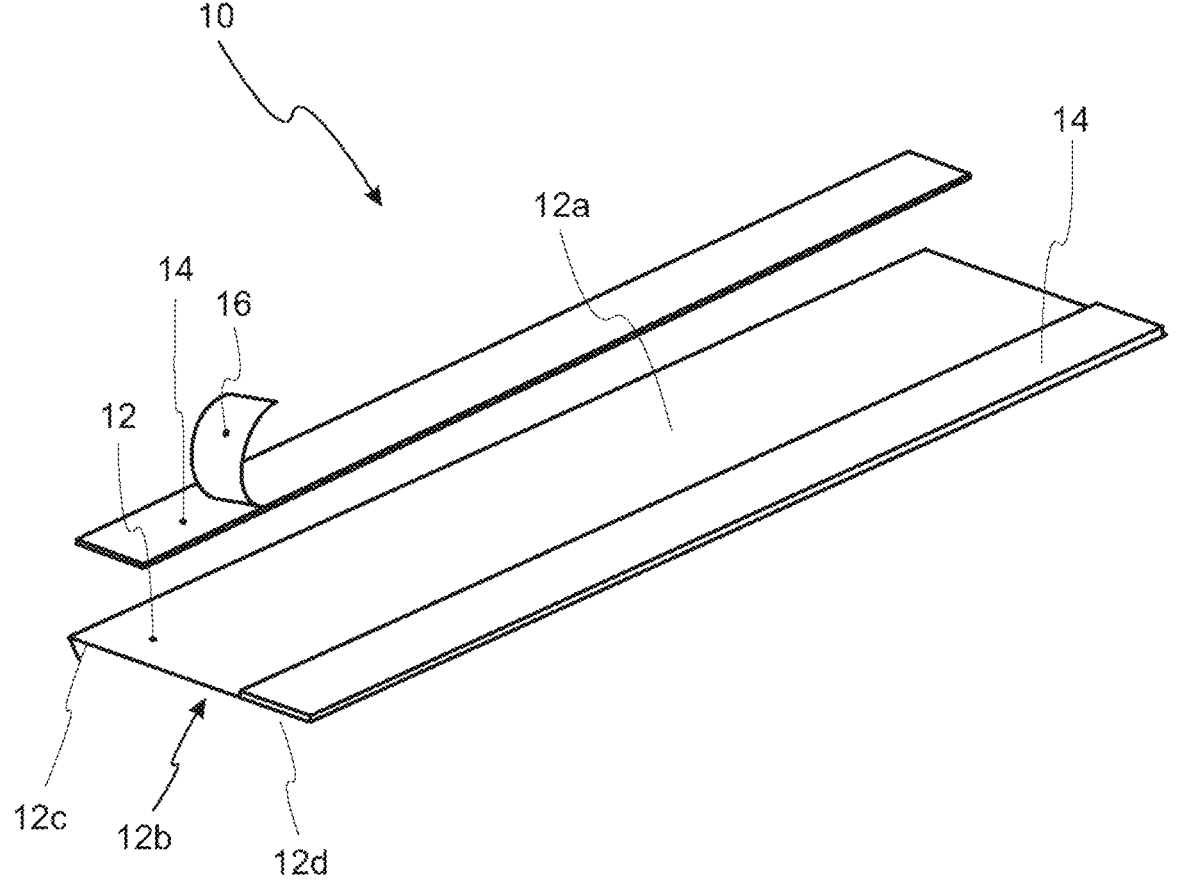
FIG. 1 is an isometric view of a pest barrier embodying principles disclosed herein.

Referring to the drawings, and initially to FIGS. 1 to 4, there is shown a pest barrier 10 comprising a mesh 12 having a first major surface 12*a* and an opposite second major surface 12*b*. To resist termite attack and entry, the mesh 12 is formed from steel, bronze or aluminium and has openings with a maximum dimension of less than 0.45 mm to physically exclude pests, including small pests such as termites, from passing through the mesh.

In the pest barrier shown in FIG. 1, a strip 14 of low density polyethylene (LDPE) is adhered along peripheral border areas at opposite ends 12*c*, 12*d* of the mesh. One end of the pest barrier 10 in FIG. 1 is shown in exploded view to more clearly show the mesh 12 and strip 14. The LDPE carries a pest repellent, such as by being impregnated with a pesticide having a residual effect. In the illustrated embodiment, the LDPE is impregnated with bifenthrin, which is an insecticide with both toxic and repellent actions. Bifenthrin is effective against termites and other insects.

In the embodiment shown in FIG. 1, the pesticide impregnated strips 14 are both provided on the same major surface of the mesh. However, in another embodiment, the pesticide impregnated strip at one end of the mesh may be provided on one major surface and the strip at the other end may be provided on the other major surface. In a further embodiment, pesticide impregnated strips may be provided on both major surfaces of the mesh at both ends of the mesh.

An adhesive, in the form of an adhesive strip 16 with a removable backing tape, partially overlays or is provided adjacent the pesticide impregnated strip 14 to facilitate securing the mesh 12 in the construction opening.

Figure 2:
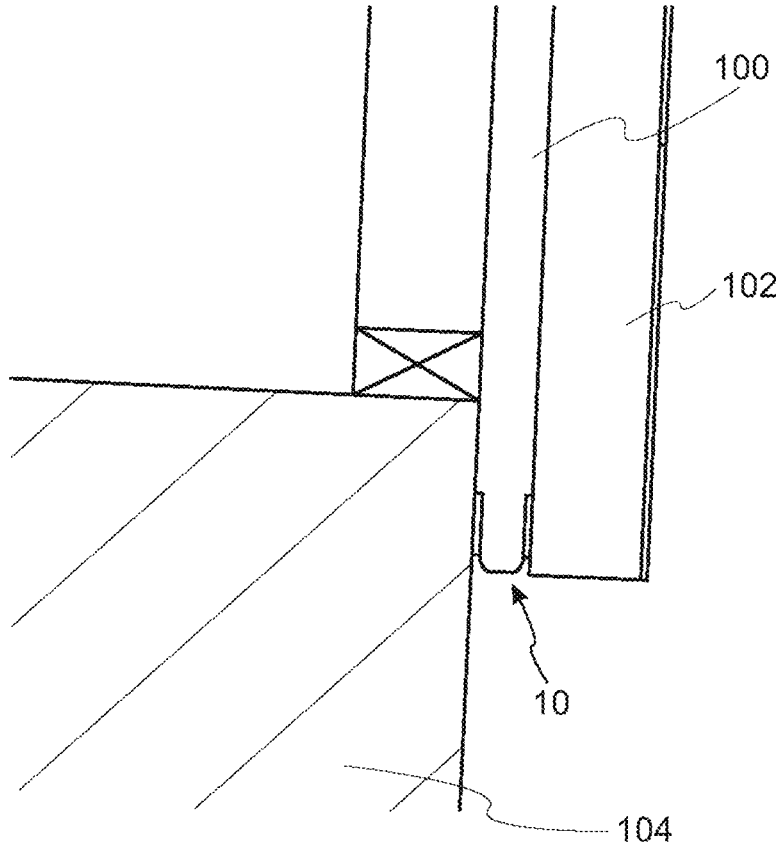
FIG. 2 is a schematic view of the pest barrier of FIG. 1 installed in a construction opening defined between a concrete slab and the external wall panel of a cavity wall.
Figure 3:
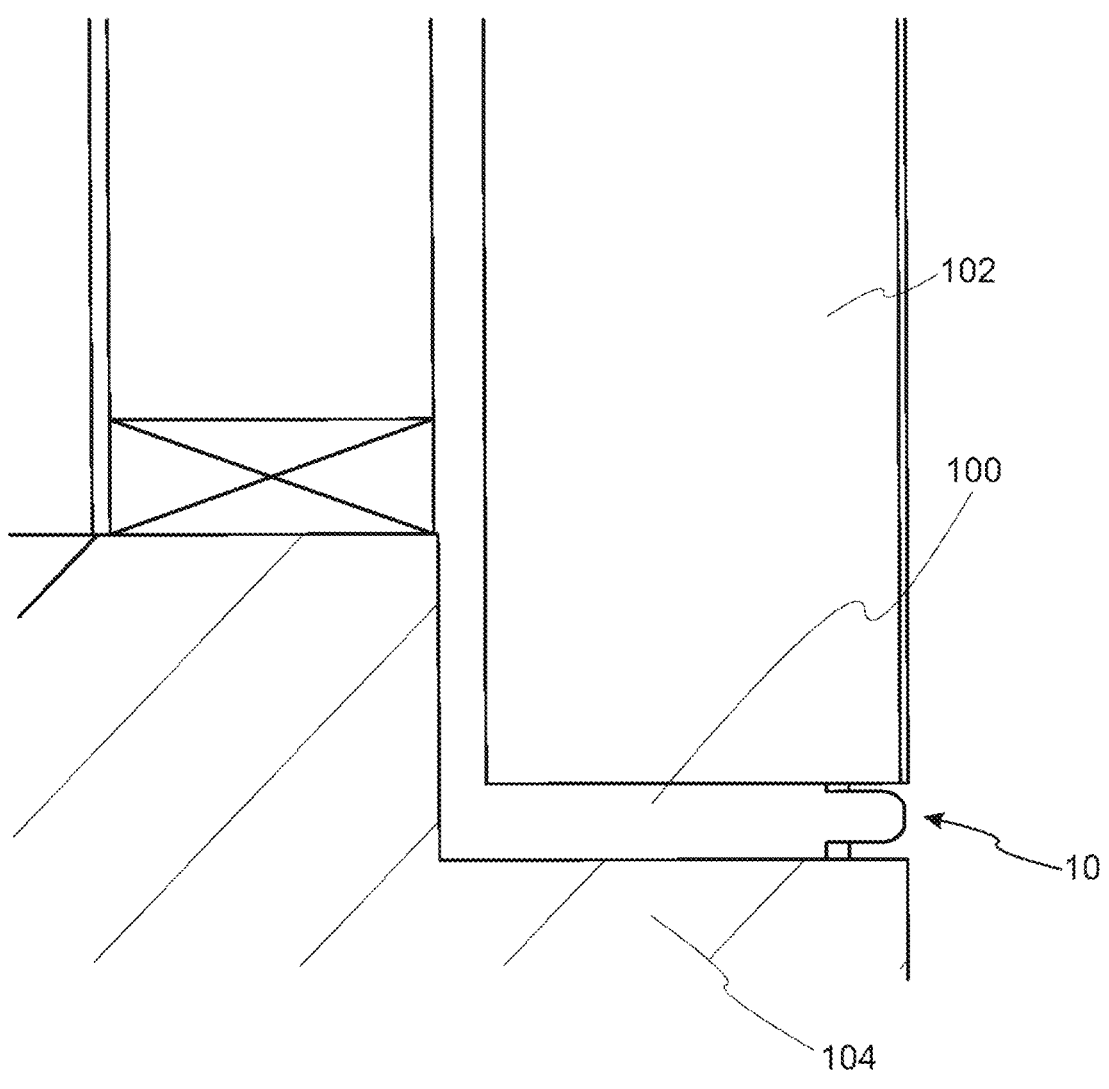
FIG. 3 is a schematic view of the pest barrier of FIG. 1 installed in a construction opening defined between a concrete slab and the external wall panel of a cavity wall.

In the absence of external forces, the pest barrier 10 has a substantially planar configuration as shown in FIG. 1. To install the pest barrier 10 in a construction opening 100 defined between a pair of mutually opposed substantially parallel surfaces, such as between an outer wall panel 102 and concrete slab 104 in a cavity wall, the mesh 12 is elastically deformed from the relatively expanded planar configuration of FIG. 1 into a relatively collapsed substantially U-shaped or folded configuration, as shown in FIGS. 2 and 3. In the relatively collapsed configuration, ends 12*c*, 12*d* of the mesh define terminal ends of the U-shape and the pesticide impregnated strips 14 face outwardly away from one another. Once the pest barrier is in place in the construction opening, the elasticity of the mesh 12 resiliently biases ends 12*c*, 12*d*, and the pesticide impregnated strips 14 located thereon, outwardly into engagement between the wall panel 102 and concrete slab 104. Friction between outwardly biased mesh ends 12*c*, 12*d* and the wall panel 102 and concrete slab 104, along with the adhesive strips 16, securely retain the pest barrier 10 in the construction opening 100.

A bulk quantity of the pest barrier 10 may be supplied in a roll format and a desired length may be cut from the roll.

Figure 4:
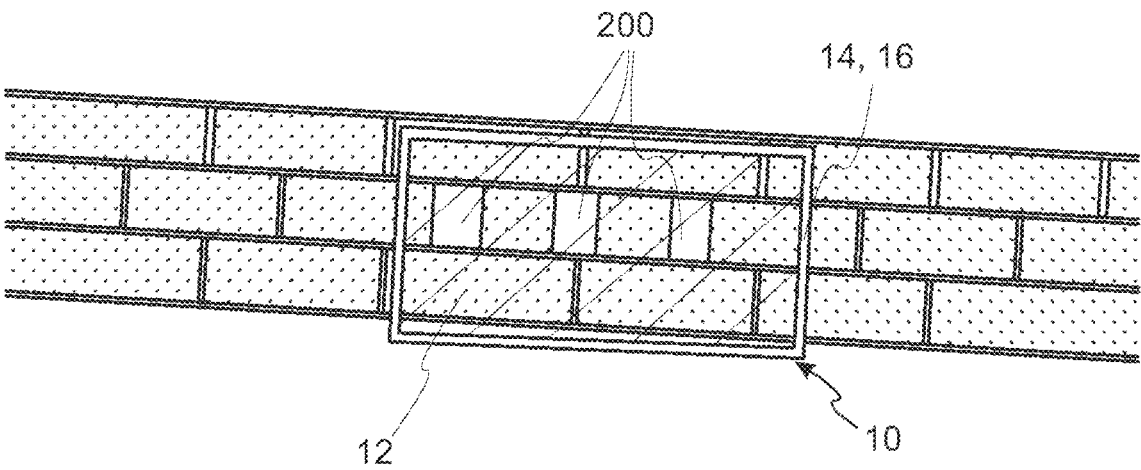
FIG. 4 is a schematic view showing a different pest barrier, but again embodying principles disclosed herein, installed over a construction opening.
Figure 5:
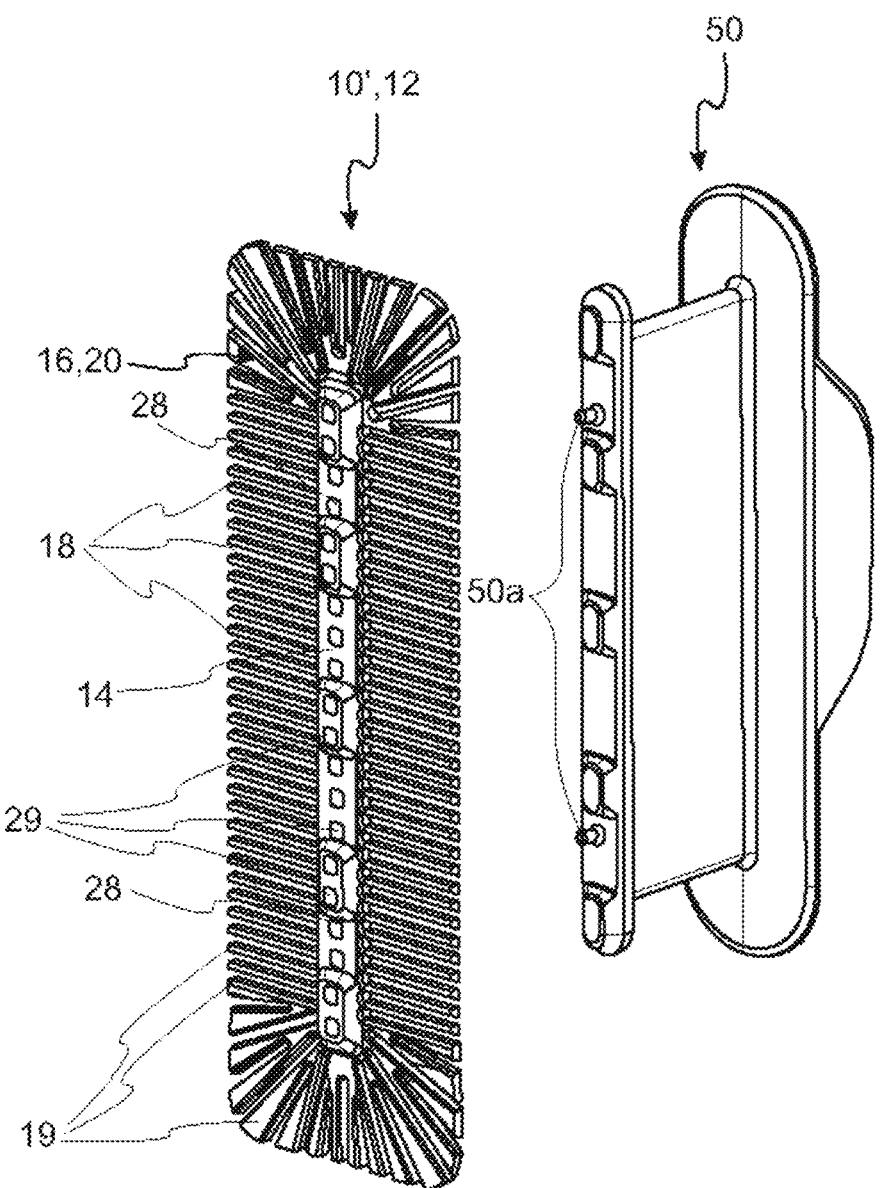
Figure 6:
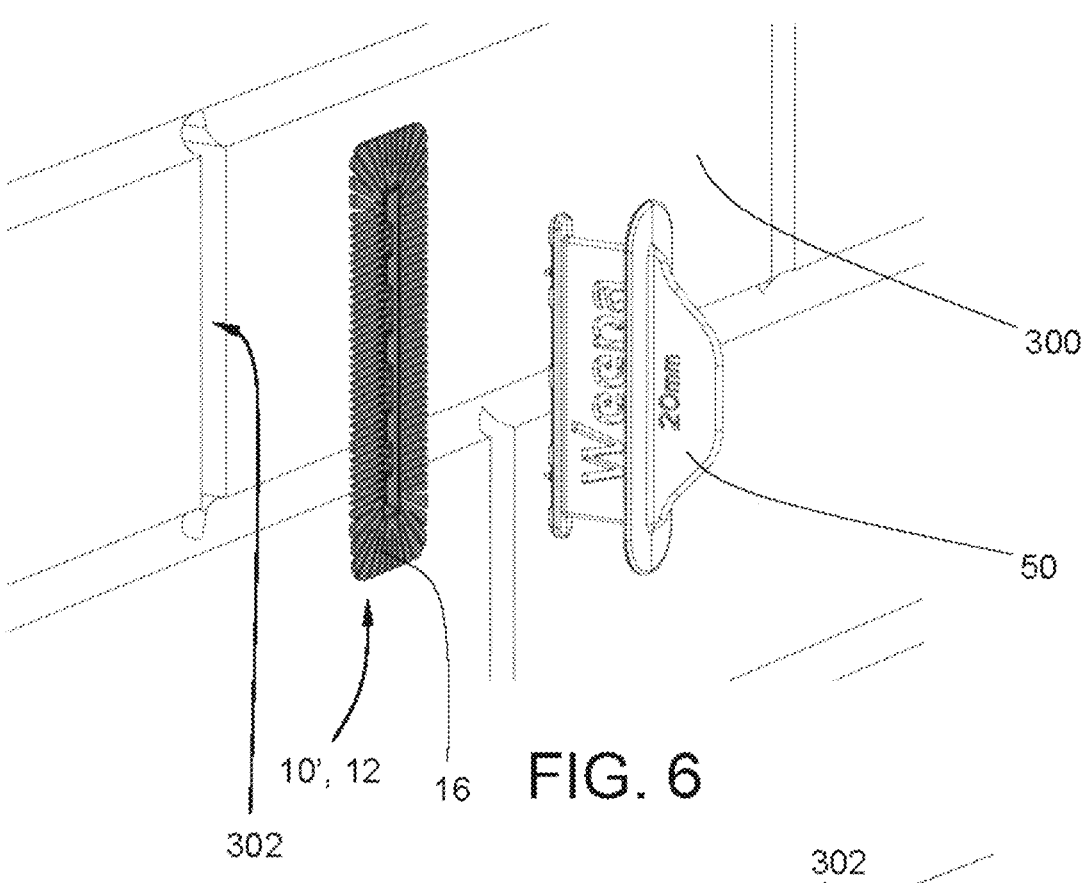
Figure 7:
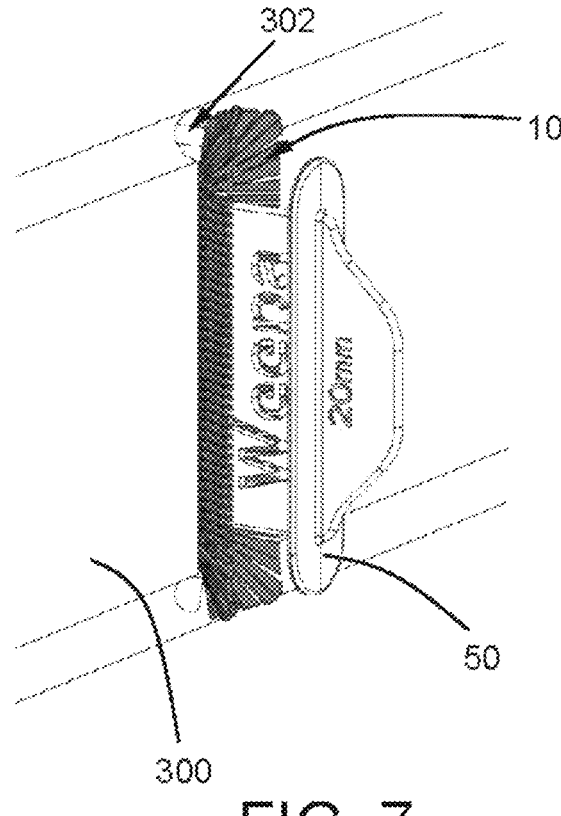
Figure 8:
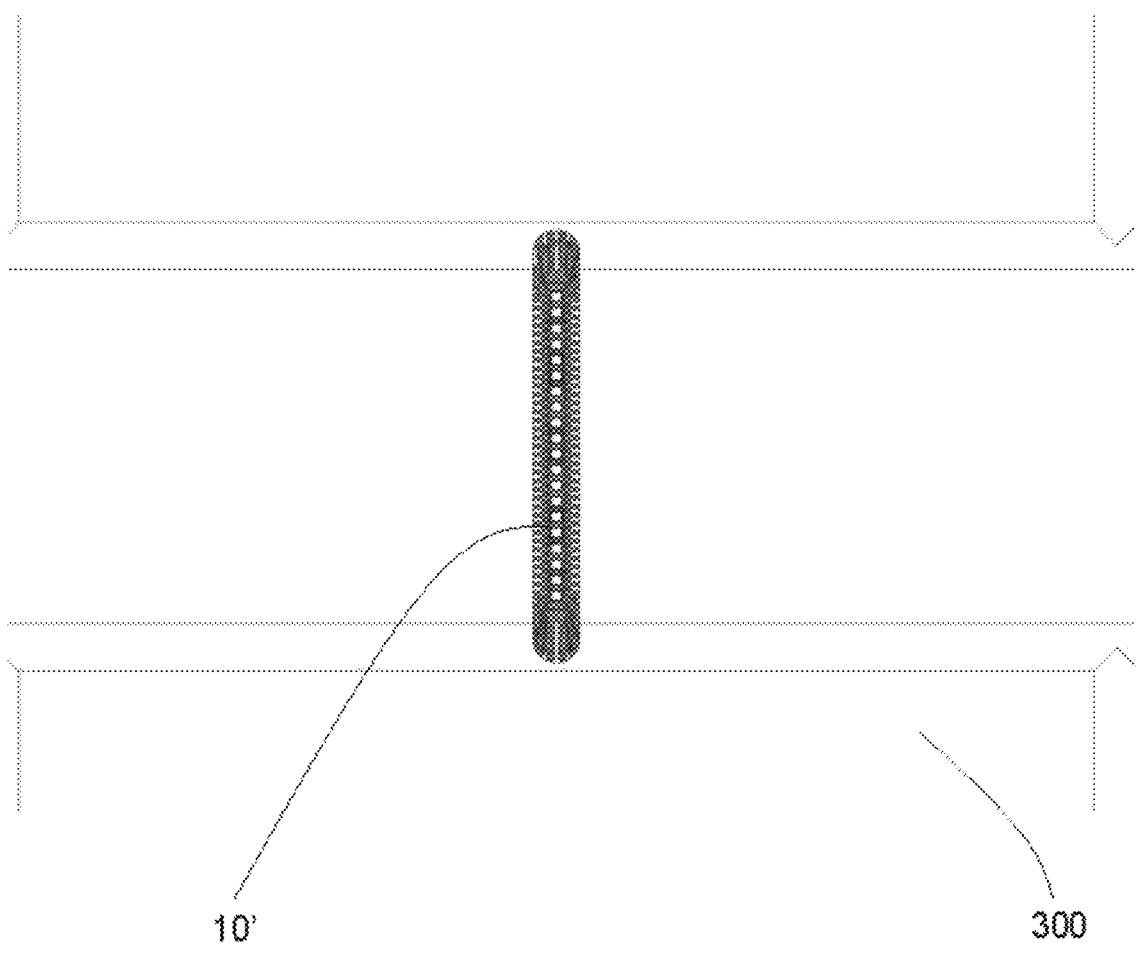

FIG. 4 shows an embodiment of the pest barrier 10 in which the pesticide impregnated strips 14 and adhesive strips 16 are provided around the entire peripheral border area of the mesh 12. This embodiment of the pest barrier 10 is particularly useful for installation over masonry wall vent openings 200 or other construction openings. The mesh 12 in this embodiment may be an elastically deformable mesh similar to the mesh used in the embodiments of FIGS. 1 to 3 or may be a more rigid mesh.

The pesticide impregnated strips 14 provide pest repellent efficacy in a zone extending a predetermined distance from the surface of the strips 14. Specifically, pest repellent carried by the strips 14 has efficacy in a zone that extends a distance of at least 2 mm from the surface of the strips 14 to deter insect pests, including termites, from passing through any gaps that may inadvertently exist between the strips 14 and walls of the construction opening or between the strips 14 and the mesh 12. The present inventors have found that strips 14 carrying 0.1 wt % bifenthrin will act to deter most species of termite in such a 2 mm zone. The present inventors have found that in some circumstances it may be preferable for strips 14 to carry a higher concentration of pesticide, such as a concentration of at least around 0.2 wt % bifenthrin or at least around 0.3 wt % bifenthrin or at least around 0.4 wt % bifenthrin or at least around 0.5 wt % bifenthrin. Such circumstances include those discussed in the paragraphs below.

Instead of or in addition to the strips 14 carrying pest repellent, the mesh 12 can carry pest repellent. In such embodiments, the mesh 12 can be made from a wider range of materials, including polymers such as LDPE, PP, PVC or PU, which would be susceptible to termite attack in the absence of the pest repellent, and/or can include openings with a maximum dimension greater than 0.45 mm, such as 2 mm or more, since termites will be deterred by the pest repellent carried by the mesh 12 rather than being physically excluded by the mesh. Moreover, by increasing the concentration of pest repellent carried by the mesh 12, the efficacy zone of the pest repellent is enlarged, meaning that the size of the openings in the mesh 12 can be enlarged to increase ventilation through the associated construction opening.

A pest repellent carrying substrate, such as strip 14, may also be used to deter pests from passing through other building openings, such as gaps around entrance doors. In such a case, a strip 14 may be installed along one of more of the top, bottom and sides of the door and/or between the door frame and a masonry wall in which the door frame is installed. A pest repellent carrying substrate, such as strip 14, can be used in a similar manner to deter pests from passing through gaps in building windows, such as gaps between a window insect screen frame and a surrounding window frame and/or between the window frame and a masonry wall in which the window frame is installed.

FIGS. 5-8 show a pest barrier 10' for installation in a weep hole 302 in a masonry wall 300. The pest barrier 10' comprises a unitary body 12 having a relatively rigid spine portion 14 and a resilient fringe 16 extending around the top and opposite side edges of the body 12. The fringe 16 is defined by slits 18 in the body 12, which define tabs 19 therebetween, and is oversized relative to the size of the weep hole 302. A front (relative to a forward insertion direction of the insert 10' into the weep hole 302) surface 20 of the fringe 16 is adapted for engaging walls of the weep hole 302. The body 12 may be formed from low density polyethylene (LDPE), which is a relatively low friction material, and as such facilitates insertion of the pest barrier 10' into the weep hole 302.

In some embodiments, a metal mesh screen is embedded in the body 12 of pest barrier 10', as disclosed in the present applicants' earlier International Patent Publication No. WO 2009/003230 A1, the disclosure of which is incorporated herein by reference. Accordingly, in such embodiments, the screen is spaced apart from the front surface 20 of the fringe 16. Therefore, when the pest barrier 10' is inserted into the weep hole, the body 12 separates the mesh screen from the walls of the weep hole 302. Apertures 28 in the spine portion 14 of the body 12 of pest barrier 10' facilitate engagement of a detachable handle 50 to the body 12, with prongs 50a of the handle being engageable with the apertures 28. The apertures 28, and additional apertures 29 in the spine portion 14, also provide for ventilation of the weep hole 302 through the body 12.

The body 12 and the fringe 16 are impregnated or coated with a pest repellent that has efficacy in a zone extending a predetermined distance from a surface of the body 12 and fringe 16. Specifically, pest repellent carried by the body 12 has efficacy in a zone that extends from the perimeter of the apertures 28, 29 across the void area of the apertures 28, 29, and efficacy in a zone that extends from the perimeter of the tabs 19 across the void area of the slits 18. In the illustrated embodiment, the apertures 28, 29 are approximately 2 mm by 2 mm and the width of the slits 18 is approximately 1 mm. Accordingly, the concentration of pest repellent carried by the body 12 is selected to provide efficacy within a zone extending at least 1 mm from the surface of the body 12 or, in relevant embodiments, from a pest repellent coating carried thereon. The present inventors have found that forming body 12 from, or coating it with, a material comprising 0.1 wt % bifenthrin will act to deter, for two years from the date of installation of the pest barrier, most species of termite from approaching the pest barrier 10' and from passing through the slits 18, the apertures 28, 29 and any gaps that may inadvertently exist between the fringe 16 and walls of a weep hole 302 in which the pest barrier is installed. The present inventors have found that in some circumstances it may be preferable for body 12 or coating to have a higher concentration of pesticide, such as a concentration of at least around 0.2 wt % bifenthrin, or at least around 0.3 wt % bifenthrin or at least around 0.4 wt % bifenthrin or at least around 0.5 wt % bifenthrin. Such circumstances include those discussed in the paragraph below. By increasing the concentration of pest repellent carried by the body 12 and fringe 16, the efficacy zone of the pest repellent is enlarged, meaning that the apertures 28, 29 and the width of the slits 18 can be enlarged, to increase ventilation through the associated weep hole 302.

Figure 9:
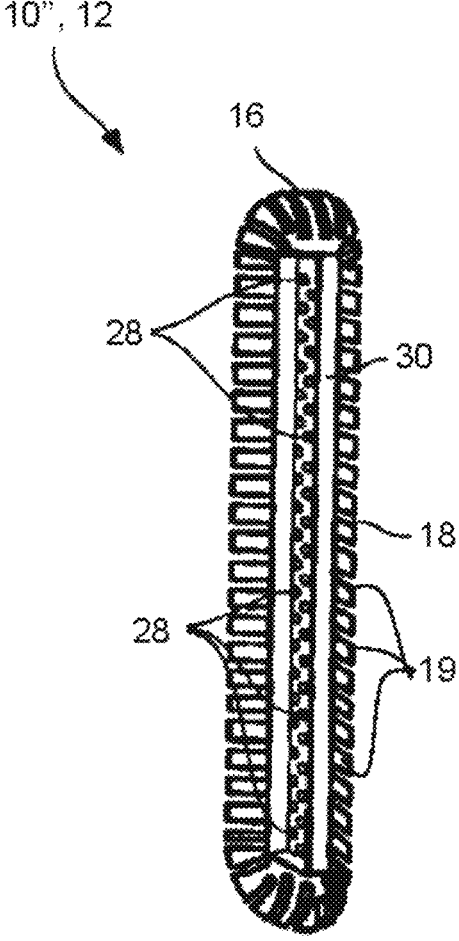
FIG. 9 is an isometric view of another pest barrier for installation in a masonry wall weep hole, the pest barrier embodying principles disclosed herein.

FIG. 9 shows a pest barrier 10" that shares many features in common with the pest barrier 10' of FIGS. 5-8, where corresponding reference numerals indicate corresponding features with corresponding functionality. Pest barrier 10", however, comprises a frame or core formed from stainless steel sheet. The resilient fringe 16 of the pest barrier 10" is preformed with a curve away from a plane of the spine portion 14 to facilitate insertion of the pest barrier 10" into the weep hole. The pest barrier 10" has a reinforcing rib 30 formed on the body 12. The reinforcing rib 30 is substantially rectangular and extends around the spine portion 14 of the body 12, inwardly of the fringe 16. The reinforcing rib 30 is defined by a deformed portion of the stainless steel sheet. Again, a detachable handle (not shown) can be engaged with pest barrier 10", via apertures 28, to facilitate installing and manipulating the pest barrier 10" in the weep hole. The body 12, including the reinforcing rib 30, and the fringe 16 are impregnated or coated with a pest repellent as described above with respect to pest barrier 10' to deter insect pests, including termites, from approaching the pest barrier 10" and from passing through the slits 18, the apertures 28 and any gaps that may inadvertently exist between the fringe 16 and walls of a weep hole in which the pest barrier is installed.

Figure 10:
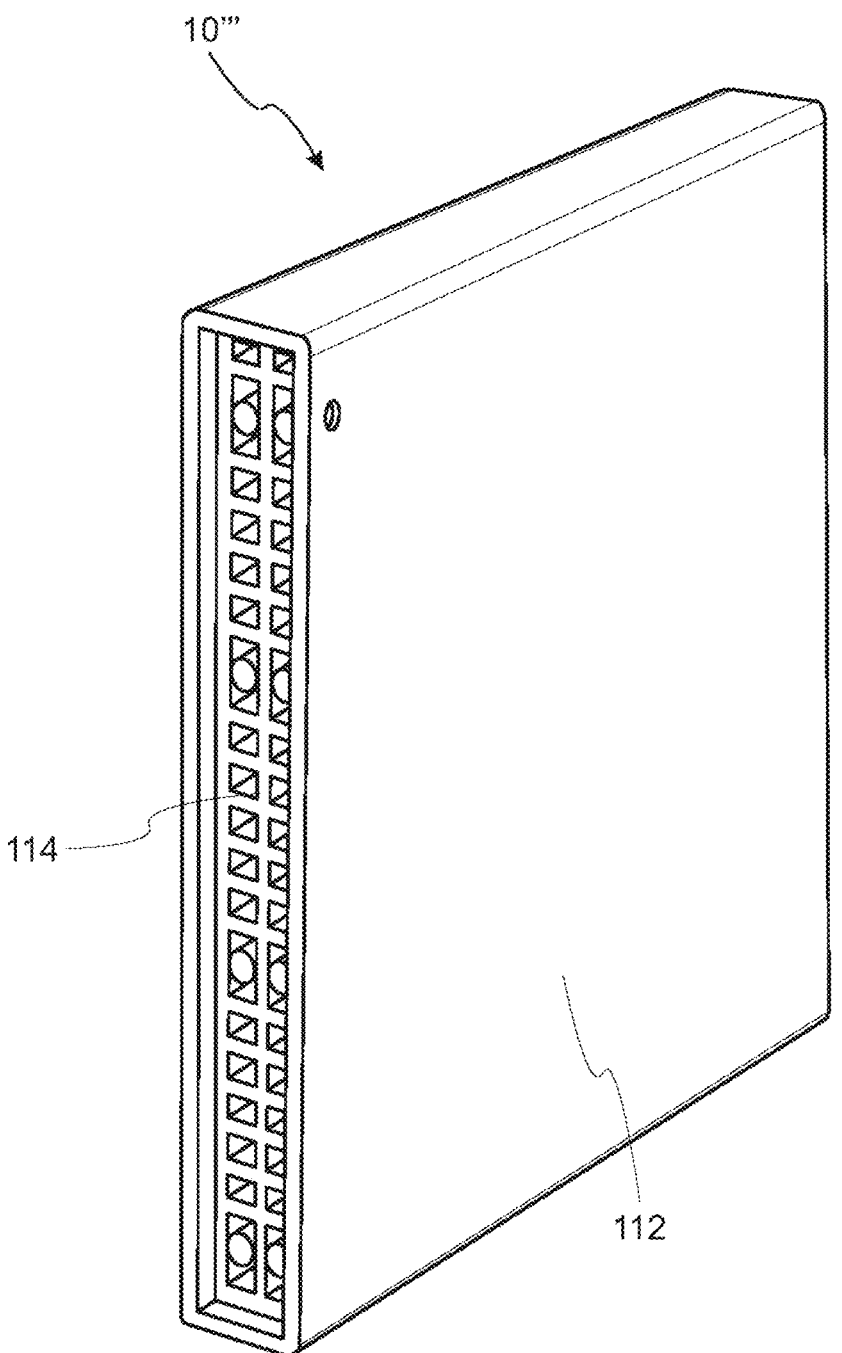
FIGS. 10 to 12 show another pest barrier for installation in a masonry wall weep hole, the pest barrier embodying principles disclosed herein.
Figures 11, 12:
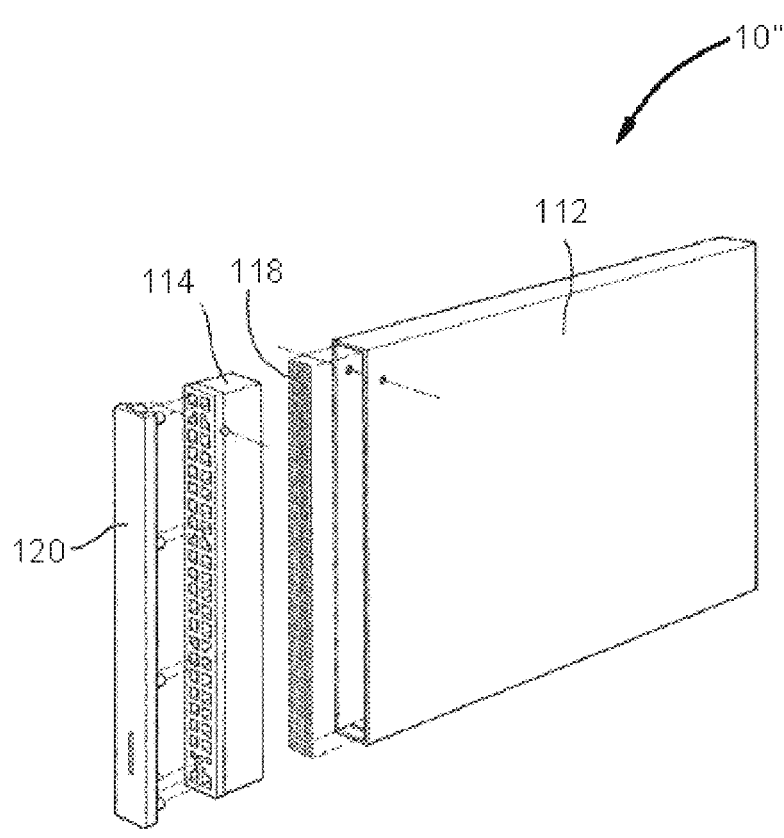
Figure 13:
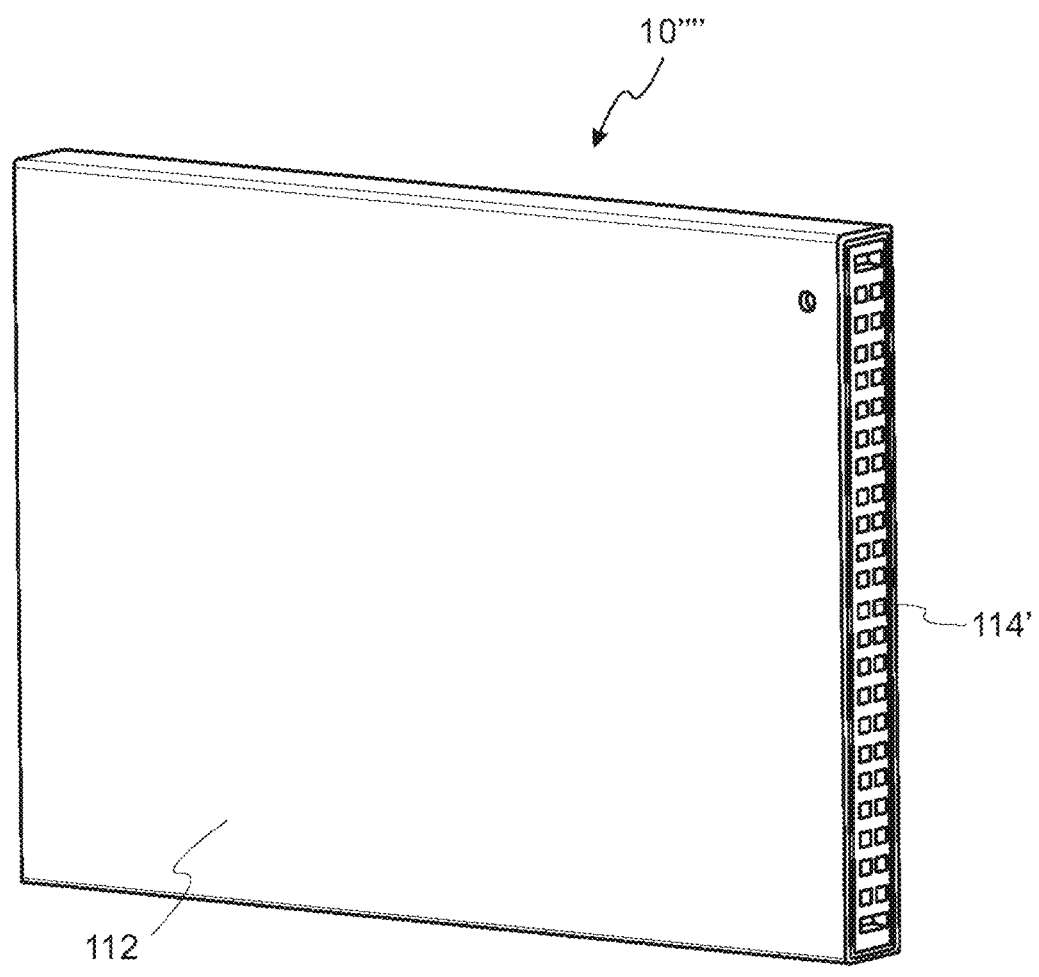
Figure 14:
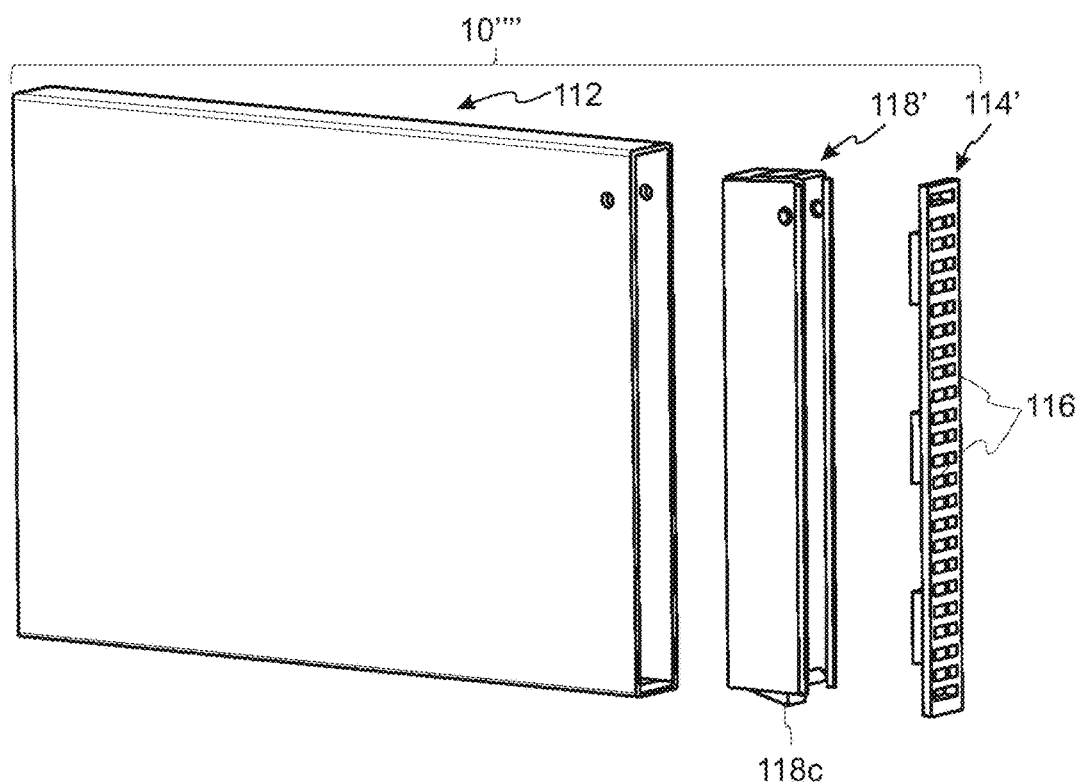
Figure 15:
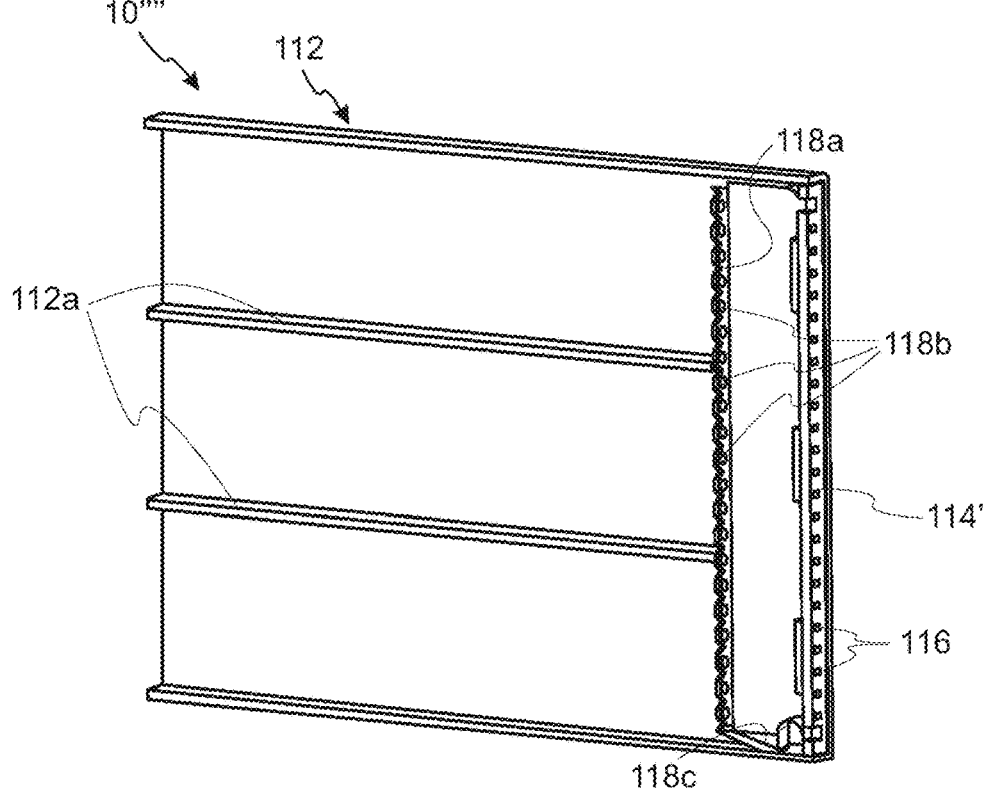

FIGS. 10-12 show a pest barrier 10''' comprising a tubular body 112, which may include internal stiffening ribs 112a. A grate 114 having ventilation apertures 116 formed therein is provided at one end of the body 112. Ventilation apertures 116 have a maximum diameter of 2 mm. A metal mesh screen 118 may be installed in the body, longitudinally inwardly of the grate 114. Cap 120 is removably connected to body 112 to cover the grate 114 and the associated end of the body 112 to prevent mortar from clogging apertures 116 and/or entering the body 112 during rendering of a masonry wall in which the pest barrier 10''' is installed. The body 112 and grate 114 are formed from polymer materials suited to the environment in which the pest barrier 10''' is to be used. For example, the body 112 and grate 114 may be formed from polypropylene (PP), low density polyethylene (LDPE) or polyvinylchloride (PVC), or the body 112 and grate 114 may be formed from different polymer materials, such as the body 112 being formed from PP and the grate 114 from PVC. At least the outer tubular portion of the body 112, and typically also the grate 114, is/are impregnated or coated with a pest repellent as described above with respect to pest barrier 10' to deter insect pests, including termites, from approaching the pest barrier 10''' and from passing through the body 112, the apertures 116 and any gaps that may inadvertently exist between the body 112 and walls of a weep hole in which pest barrier 10''' is installed. In some embodiments, the screen 118 may also be coated with pest repellent to deter insect pests, including termites, from passing through openings in the screen 118. By increasing the concentration of pest repellent carried by the body 112, the efficacy zone of the pest repellent is enlarged, meaning that the apertures 116 in grate 114 can be increased in size to increase ventilation through the associated weep hole. If the body 112 carries a sufficient concentration of pest repellent, the grate 114 can be omitted altogether to further increase ventilation through the associated weep hole.

Figure 16:
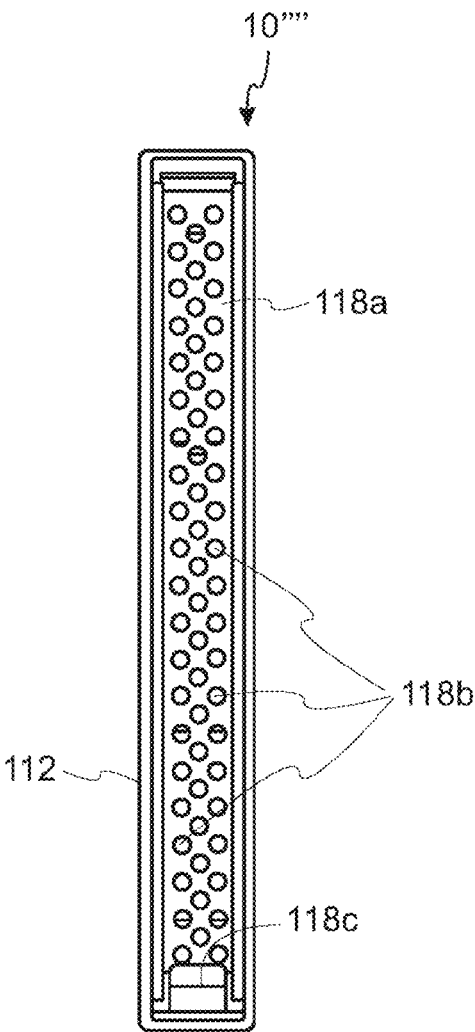

FIGS. 13-16 show a pest barrier 10'''' having many features in common with pest barrier 10''' of FIGS. 10-12, where corresponding reference numerals indicate corresponding features with corresponding functionality. In pest barrier 10'''', however, grate 114 and mesh 118 are omitted and replaced by grates 114' and 118'. FIG. 16 shows pest barrier 10'''' with grate 114' removed to allow grate 118' to be seen. Grate 118' is hingedly connected to body 112, is formed from corrosion-resistant metal, such as steel, bronze or aluminium, in some embodiments being formed from stainless steel, such as SS316 grade stainless steel. Grate 118' comprises a perforated body portion 118a having apertures 118b therein. Apertures 118b have a maximum diameter of 2 mm to permit airflow through the body 112 but to inhibit passage of embers and sparks. Grate 118' has an elastically compressible member, in the form of tab 118c, at one end of body portion 118a. Tab 118c engages an interior surface of body 112 to releasably secure grate 118' in an operative configuration in which perforated body portion 118a extends across the tubular opening defined by body 112. When unconstrained by engagement with the interior surface of body 112, tab 118c expands to increase the length of grate 118' by at least the wall thickness of body 112 at its point of engagement by tab 118c. As such, if body 112 is destroyed, for example due to exposure to fire or extreme heat, tab 118*c* will cause grate 118' to expand into direct engagement with walls of the weep hole in which pest barrier 10"" is installed to maintain the perforated body portion 118*a* in position across the tubular opening to provide continued protection against entry of embers and sparks. Grate 114' is removably connected relative to body 112, for example by being frictionally or snap-lockingly engaged with body 112 or grate 118'. Grate 114' is formed from PP, but can alternatively be formed from another polymer material, such LDPE or PVC. Grate 114' is impregnated or coated with a pest repellent, as described above with respect to pest barrier 10''', to deter insect pests, including termites, from approaching the pest barrier 10"" and from passing through the body 112, the apertures 116 and any gaps that may inadvertently exist between the body 112 and walls of a weep hole in which pest barrier 10"" is installed. By increasing the concentration of pest repellent carried by grate 114', the efficacy zone of the pest repellent is enlarged, meaning that the apertures 116 in grate 114' can be increased in size to increase ventilation through the associated weep hole. If grate 114' carries a sufficient concentration of pest repellent, the pest repellent zone of the grate 114' can extend to any gaps that may inadvertently exist between body 112 and walls of a weep hole in which pest barrier 10"" is installed, thereby negating the need for body 112 to be impregnated or coated with pest repellent. For example, the present inventors have found that if grate 114', or a coating thereon, comprises 0.35 wt % bifenthrin, it will deter, for two years from the date of installation of the pest barrier, all termite species known worldwide from approaching within about 4 mm of grate 114', and consider that increasing the concentration from 0.35 wt % to 0.5 wt % bifenthrin would increase the termite deterrent range from about 4 mm to about 6 mm, which would be sufficient to cover any likely gaps between body 112 and walls of a weep hole in which pest barrier 10"" is installed. Pest barrier 10"" may include a cap, similar to cap 120 of pest barrier 10''', that is removably connected to body 112 to cover grate 114' and the associated end of the body 112 to prevent mortar from clogging apertures 116 and/or entering the body 112 during rendering of a masonry wall in which the pest barrier 10"" is installed. Pest barrier 10"" may also include features of the weep hole insert 10 disclosed in the present applicant's co-pending Australian Patent Application No. 2018902177, the disclosure of which is incorporated herein by reference.

The inventors of the subject matter disclosed herein have found that impregnating or coating part of a pest barrier with a predetermined concentration of repellent pesticide, such as bifenthrin or another pyrethroid, the pesticide acts to deter pests, including termites, from approaching that part of the pest barrier. For example, the present inventors have found that a coating or impregnated part comprising greater than 0.1 wt % bifenthrin will act to deter most termite species from approaching within at least 2 mm of the coating or part for two years from the date of installation of the pest barrier. The present inventors have found that a coating or impregnated part comprising greater than 0.2 wt % bifenthrin will act to deter all termite species known worldwide from approaching within at least 2 mm of the coating or part for two years from the date of installation of the pest barrier. The present inventors have found that a coating or impregnated part comprising around 0.35 wt % bifenthrin will act to deter, for two years from the date of installation of the pest barrier, all species of termite known worldwide from approaching within about 4 mm of the coating or part, and consider that increasing the concentration from 0.35 wt % to 0.5 wt % bifenthrin would increase the termite deterrent range from about 4 mm to about 6 mm. The present inventors have found that the relationship between the concentration of bifenthrin (wt %) present in the coating or impregnated part to the efficacy zone of the pest repellent (i.e., distance (mm) by which most termite species are repelled from the coating or impregnated part) is approximately:

$$C=E/10$$

wherein C=concentration of bifenthrin (wt %) present in the coating or impregnated part, and E=distance (mm) by which most termite species are repelled from the coating or impregnated part.

The present inventors have found that in some circumstances it may be preferable to use a higher concentration of pesticide, such as a concentration of at least around 0.2 wt % bifenthrin or at least around 0.3 wt % bifenthrin or at least around 0.4 wt % bifenthrin or at least around 0.5 wt % bifenthrin, in the coating or impregnated part. Such circumstances may include:

where the coated or impregnated part is associated with a larger opening through which pests are to be deterred from passing;

where the pest barrier is to be installed in a location at risk of having exposure to a greater populations of pests;

in environments in which the pest repellent may degrade more rapidly, such as very high UV and/or very high temperature environments;

in windy environments;

if the coated or impregnated part may be installed for longer than 2 years; and/or where the pest barrier is to be installed in a location having exposure to more voracious termite species, such as mastotermes and others found in tropical climates.

It will be appreciated that the illustrated pest barriers 10, 10', 10", 10''', 10"" have a number of advantages, many of which will be apparent from the detailed description provided above. For example, by impregnating or coating relevant portions of the pest barriers 10, 10', 10", 10''', 10"" with pest repellent:

insect pests, including termites, are discouraged from approaching the pest barrier and from passing through any gaps that may inadvertently, or intentionally, exist between the pest barrier and the associated construction opening 100, 200 or weep hole 302;

the size of openings in the pest barrier 10, 10', 10", 10''', 10"" can be increased to improve ventilation through the associated construction opening 100, 200 or weep hole 302 without compromising the performance of the barrier in inhibiting passage of pests through the associated construction opening or weep hole 302; and the concentration of pest repellent in the impregnated or coated part can be increased to increase the size of the zone in which pests are repelled.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive. Examples of possible variations and/or modifications include, but are not limited to:

instead of or in addition to bifenthrin, the pest barriers 10, 10', 10", 10''', 10"" may be impregnated or coated with a different pesticide or pest repellent capable of deterring the target pest species, such as another pyrethroid, e.g., cypermethrin, permethrin, fenitrothion or fenvalerate, or another pest repellent chemical having a residual effect, such as disodium octaborate tetrahydrate or chlorpyrifos;

forming the strips 14 of pest barrier 10 from a polymer material other than LDPE, such as from PVC or PU;

instead of being adhered to the mesh 12, the ends of the mesh 12 of pest barrier 10 may be coated with LDPE, or another suitable polymer material, to form the strip 14 or the strip 14 may be otherwise mechanically or chemically connected to the mesh 12; and/or the adhesive strip 16 of pest barrier 10 may be omitted and pest barrier may be secured in a construction opening by friction and resilient engagement of mesh ends 12c, 12d with the walls of the construction opening, and may be secured over a construction opening by a chemical or mechanical fastener.

The invention claimed is:

1. A pest barrier, comprising:
a body for installation in a weep hole opening in a masonry wall to inhibit passage of termites through the weep hole opening, the body being formed from a plurality of components, the plurality of components comprising a physical barrier configured to extend across the weep hole opening when the body is installed therein, the physical barrier having a plurality of openings extending therethrough to facilitate ventilation through the weep hole opening when the body is installed therein, at least some of the plurality of openings having a maximum transverse dimension of greater than 0.45 mm so as not to physically exclude termites having a head diameter of up to the maximum transverse dimension from passing through the at least some of the plurality of openings; and
a termite repellent carried by at least one of the plurality of components and having termite repelling efficacy within a first zone extending a predetermined first distance inwardly from a perimeter of each of the at least some of the plurality of openings to prevent termites, including termites having a head diameter of up to the maximum transverse dimension, from passing through the at least some of the plurality of openings, the predetermined first distance being at least half of the maximum transverse dimension, and one or more of the at least one of the plurality of components being a removable component of the body; wherein:
the body comprises a tubular housing defining an elongate passageway extending through the body;
the physical barrier extends across the passageway; and
the at least one of the plurality of components comprises the physical barrier.

2. The pest barrier of claim 1, wherein the predetermined first distance is at least 2 mm.

3. The pest barrier of claim 1, wherein the termite repellent comprises a pyrethroid.

4. The pest barrier of claim 3, wherein the termite repellent comprises bifenthrin, cypermethrin, permethrin, fenitrothion and/or fenvalerate.

5. The pest barrier of claim 1, wherein the termite repellent comprises disodium octaborate tetrahydrate and/or chlorpyrifos.

6. The pest barrier of claim 1, wherein said efficacy within the first zone is provided by the at least one of the plurality of components:
being impregnated with the termite repellent; or
having a coating comprising the termite repellent.

7. The pest barrier of claim 6, wherein the impregnated at least one of the plurality of components or the coating comprises at least 0.1 wt % bifenthrin.

8. The pest barrier of claim 6, wherein the impregnated at least one of the plurality of components or the coating comprises between 0.1 wt % and 0.3 wt % bifenthrin.

9. The pest barrier of claim 6, wherein the impregnated at least one of the plurality of components or the coating comprises between 0.3 wt % and 0.5 wt % bifenthrin.

10. The pest barrier of claim 1, wherein each of the at least one of the plurality of components is formed from a polymer material.

11. The pest barrier of claim 1, wherein the physical barrier is removably connected to the tubular housing.

12. The pest barrier of claim 6, wherein the impregnated at least one of the plurality of components or the coating comprises bifenthrin present in a weight percent concentration at least one-twentieth of the predetermined first distance measured in millimetres.

13. The pest barrier of claim 6, wherein the impregnated at least one of the plurality of components or the coating comprises bifenthrin present in a weight percent concentration at least one-tenth of the predetermined first distance measured in millimetres.

14. The pest barrier of claim 1, wherein the termite repellent carried by at least one of the plurality of components has termite repelling efficacy within a second zone extending a predetermined second distance outwardly from the body toward the periphery of the weep hole opening to prevent termites from passing through each of one or more second opening in the second zone, the predetermined second distance being at least 2 mm.

15. A pest barrier, comprising:
a body for installation in a weep hole opening in a masonry wall to inhibit passage of termites through the weep hole opening, the body being formed from a plurality of components, the plurality of components comprising a physical barrier configured to extend across the weep hole opening when the body is installed therein, the physical barrier having a plurality of openings extending therethrough to facilitate ventilation through the weep hole opening when the body is installed therein, at least some of the plurality of openings having a maximum transverse dimension of greater than 0.45 mm so as not to physically exclude termites having a head diameter up to the maximum transverse dimension from passing through the at least some of the plurality of openings; and
a termite repellent carried by at least one of the plurality of components and having termite repelling efficacy within a first zone extending a predetermined first distance inwardly from a perimeter of each of the at least some of the plurality of openings to prevent termites, including termites having a head diameter of up to the maximum transverse dimension, from passing through the at least some of the plurality of openings, the predetermined first distance being at least half of the maximum transverse dimension, and one or more of the at least one of the plurality of components being a removable component of the body;
wherein the body comprises a spine portion and a resilient fringe extending at least partially around the spine portion, the spine portion and the resilient fringe defining the physical barrier.

* * * * *